United States Patent [19]

Schirado et al.

[11] Patent Number: 5,348,048
[45] Date of Patent: Sep. 20, 1994

[54] QUICK CONNECT COUPLING SYSTEM

[76] Inventors: Lowell C. Schirado, 1902 Forest Lake, SE., Grand Rapids, Mich. 49546; James L. Chambers, 3205 Giddings, SE., Grand Rapids, Mich. 49508; Richard H. Whitaker, 2192 Lamont, NW., Grand Rapids, Mich. 49504

[21] Appl. No.: 2,441

[22] Filed: Jan. 8, 1993

[51] Int. Cl.$^5$ ............................................. F16K 24/00
[52] U.S. Cl. ................................. 137/588; 251/152; 285/361; 141/309
[58] Field of Search ............... 137/588, 587, 844, 845; 251/148, 152; 141/309; 285/360, 361, 376, 396, 401, 402

[56] References Cited

U.S. PATENT DOCUMENTS

| | | | |
|---|---|---|---|
| 996,588 | 6/1911 | Kennedy | 137/846 X |
| 1,368,204 | 2/1921 | Wood | 137/542 |
| 2,224,296 | 12/1940 | Hoffman | 215/260 |
| 2,382,427 | 8/1945 | Langdon | 137/846 X |
| 2,648,553 | 8/1953 | Ulrich | 285/361 X |
| 2,948,297 | 8/1960 | Langdon | 137/846 |
| 3,243,071 | 3/1966 | Kimmel | 215/260 |
| 3,298,370 | 1/1967 | Beatty | 604/350 |
| 3,422,844 | 1/1969 | Grise | 137/847 |
| 3,456,650 | 7/1969 | Schwartzman | 604/298 |
| 3,923,203 | 12/1975 | Anderson, Jr. | 137/588 X |
| 3,967,645 | 7/1976 | Gregory | 137/846 |
| 3,985,156 | 10/1976 | Walker | 137/588 X |
| 4,114,782 | 9/1978 | Berry | 222/382 |
| 4,160,383 | 7/1979 | Rauschenberger | 137/588 X |
| 4,346,703 | 8/1982 | Dennehey et al. | 604/406 |
| 4,439,188 | 3/1984 | Dennehey et al. | 604/283 |
| 4,443,028 | 4/1984 | Hayes | 285/38 |
| 4,548,344 | 10/1985 | Hestehave et al. | 222/464 |
| 4,629,159 | 12/1986 | Wellenstam | 251/149.6 |
| 4,632,433 | 12/1986 | Kimura | 285/361 X |
| 4,824,145 | 4/1989 | Carlsson | 285/38 |
| 4,828,554 | 5/1989 | Griffin | 604/350 |
| 4,838,875 | 6/1989 | Somor | 604/262 |

*Primary Examiner*—John Rivell
*Attorney, Agent, or Firm*—Michael A. Mohr; Jill M. Beckman

[57] ABSTRACT

A male/female quick-connect system is provided which is adapted to sealingly couple to the opening of a container of liquid product. The female component of the system is adapted to couple to any standard ¾" plumbing fitment and/or ¼" ID standpipe and is self-venting so that any stock container can be used without modification. The male component which sealingly couples to the female component is provided with a barbed tip adapted to receive a variety of feed line sizes. A one-way elastomeric valve is disposed in the male member which only allows product to flow therethrough when the male component is coupled to a source of vacuum thereby preventing product from flowing back into the container. A shipping plug is provided which sealingly couples to the female component during shipping and/or storage of a container of liquid product which, in one preferred embodiment, is adapted with a one-way vent valve to allow excess pressure to be expelled from within the container while preventing outside contaminants from entering therein.

9 Claims, 4 Drawing Sheets

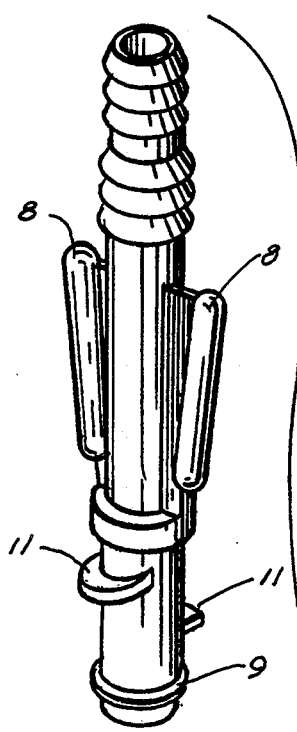
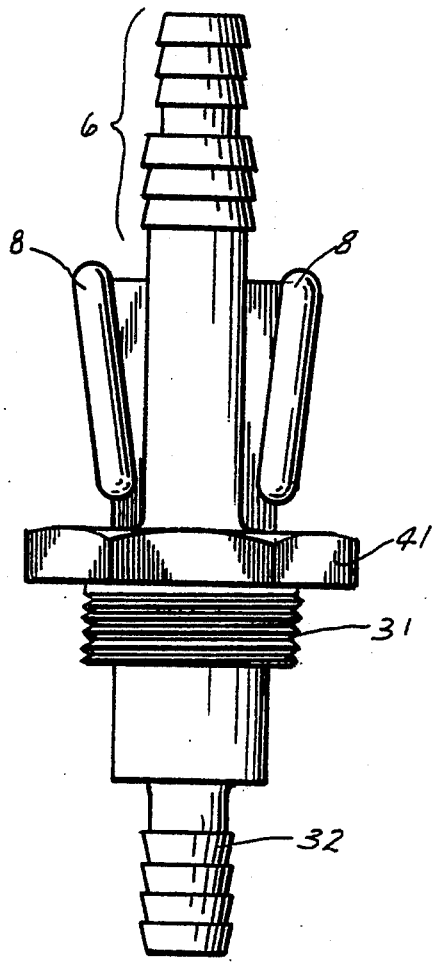
Fig. 5.
Fig. 6.
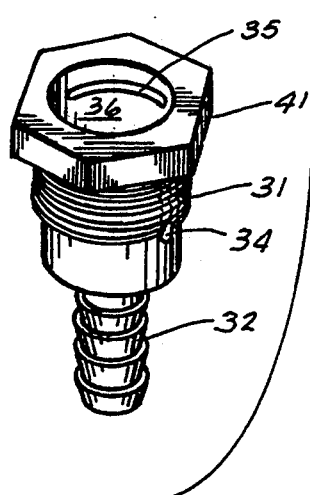
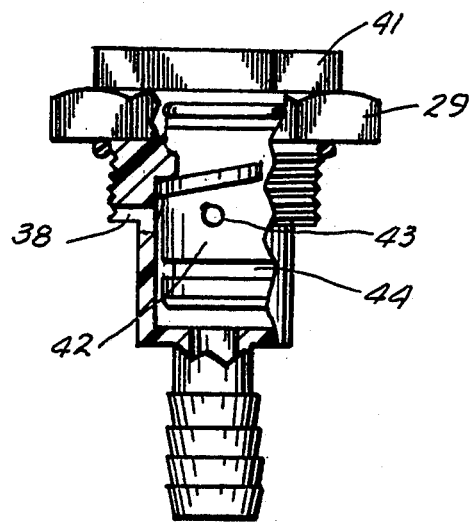
Fig. 7.

QUICK CONNECT COUPLING SYSTEM

BACKGROUND OF THE INVENTION

The present invention is generally directed to liquid dispensing apparatus and, more particularly, to a quick-connect/disconnect coupling for the transfer of liquid chemicals which are unsuitable for contact with human skin from a container via a vacuum feed line connected to a pump.

Presently, when a vacuum feed line is used while pumping a liquid chemical product from a container, the feed line is inserted directly into the container and immersed in the liquid. During pumping, the container remains open and the liquid is exposed to the atmosphere, which allows the release of hazardous fumes and allows evaporation as well as product spillage. When the pump evacuates the container of its liquid, the user must pull out the feed line in order to then reseal the container to seal any hazardous fumes therein. Further, when the feed line is removed from the container product residue often remains thereon, thus risking exposure of the product to the user's skin or clothing. When the pump is shut off, any product remaining within the feed tube will often backflow out the end of the tube, risking a spillage hazard.

SUMMARY OF THE INVENTION

These and other problems are solved by the provision of a male/female quick-connect/disconnect system adapted to sealingly couple a vacuum pump line to the opening of a container of liquid product. The female component of the system is adapted to couple to any standard $\frac{3}{4}''$ plumbing fitment and/or $\frac{1}{4}''$ ID standpipe, and is self-venting so that any stock container can be used without modification. The male component, which sealingly couples to the female component, is provided with a stepped barbed end tip adapted to receive a variety of feed line sizes. A flexible one-way valve is disposed within the male component which allows product to flow therethrough only when the male component is coupled to a source of vacuum, thereby preventing product from flowing back into the container.

One advantage of the present invention is the provision of a quick-connect/disconnect type coupling, as set forth above, and the provision of a quick-connect/disconnect type coupling that is assembled with the use of press fitments, thus rendering other methods of assembly such as solvent bonding and sonic welding unnecessary, thereby minimizing manufacturing costs.

Another advantage of the present invention is the provision of a quick-connect/disconnect type coupling that can be manufactured using a low-cost and widely available polymer resin to further minimize manufacturing costs.

Therefore, in accordance with preferred embodiments of the present invention, a male/female quick-connect/disconnect system is provided which comprises two major components: A male connector at one end having a flexible one-way valve disposed therein and a female connector which is adapted to receivably engage the male connector and is coupled directly to the opening of a container of liquid product at another end. A shipping plug is also provided which is adapted to be receivably engaged within the female connector during shipment of a container of liquid product which, in one preferred embodiment, is provided with a passage therethrough and a one-way vent.

The female component is provided with a hollow tip which, in normal operation, will extend into a container of liquid and have a standpipe attached thereto. The tip of the female component can be barbed and stepped to accept standpipes of various inside dimensions.

During shipping, a male shipping plug, having a threaded portion employing external threads and having a radial seal disposed thereon, is inserted into the female component within the internally threaded chamber, and threadingly and sealingly engaged therewith. The shipping plug may be provided with a flexible one-way vent to release pressure from within the container. The internal threads of the female component and the external threads of both the shipping plug and the male component are provided with a multiple start, coarse pitch, discontinuous thread configuration, thereby providing a high ratio of axial movement to rotational movement, whereby a 90° (or $\frac{1}{4}$) turn will fully thread and unthread either the shipping plug or the male component from the female component. The female component is also provided with external threads configured to threadingly couple to a container having an opening provided with standard $\frac{3}{4}''$ plumbing fitment threads.

In operation, prior to pumping liquid from a container, the user will first unscrew the shipping plug from the female component and either discard it or set it aside for later use. In removing the shipping plug the user may either unscrew the shipping plug manually or use an open end wrench or the like. As in the preferred embodiment, the shipping plug is provided with hexagonal sides adapted to accommodate such a tool.

After removal of the shipping plug is accomplished, the male component of the quick-connect system, which features an externally threaded portion having a radial seal disposed thereon, may be coupled to the female component by inserting the male threaded portion in the female threaded chamber and gripping and turning the male component 90° clockwise to fully seat the male threaded portion within the threaded chamber of the female component. Thus, the tubular passage throughout the female component will now be in fluid communication with a coaxial passage extending through the male component. If the user fails to bottom out the threaded male portion within the female component, the radial seal disposed upon the male threaded portion will maintain a fluid seal against the annular sealing surface within the threaded chamber.

The male component is preferably provided with a stepped barbed tip disposed on the end opposite the externally threaded portion, and is adapted to accept vacuum feed line tubes of a variety of inside diameters. The male barbed tip is tapered having the smaller barbs disposed adjacent to its terminus, with the larger barbs tapering back from its terminus. Thus, a vacuum feed line tube having an inside diameter size corresponding to the diameter of the larger barbs will fully envelop the smaller barbs while creating a sealing relationship with the larger barbs.

During pumping, a flexible, one-way valve, commonly termed a "duckbill" valve, disposed coaxially within the tubular passage of the male component will only allow fluid to flow in the direction from the container toward the vacuum pump. Thus, when the male component is unthreaded from the female component to uncouple the pump from the container, backflow from the vacuum feed line is obstructed by the aforementioned duckbill valve. In order to prevent the container from collapsing due to the vacuum caused by the vacuum pump, an air space is provided which is defined by the space between the threaded portion of the male component and the threaded chamber of the female component above the radial seal and is in air communication with a vent hold provided in the side of the female component which is in air communication with both the outside atmosphere and the air inside of the container. Thus, the outside air pressure and air pressure within the container will be equalized.

BRIEF DESCRIPTION OF THE DRAWINGS

FIG. 5 is an exploded view shown in perspective of the male component exploded away from the female component and the flexible one-way valve exploded away from the male component of the present invention.

FIG. 6 is a side elevational view of the male component and female component of the present invention threadingly engaged.

FIG. 7 is an elevational view partially in section showing the shipping plug of the present invention coupled with the female component.

DETAILED DESCRIPTION OF THE PREFERRED EMBODIMENT

Figure 1:
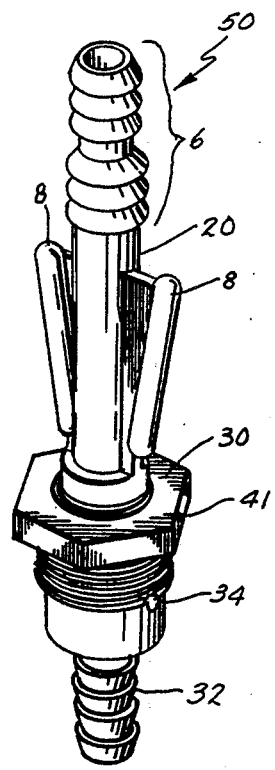
FIG. 1 is a perspective view of the quick-connect coupling of the present invention showing the male component coupled with the female component.

Referring generally to the figures in the drawings, and in particular FIG. 1, a male/female quick-connect system of the present invention is shown generally at 50. The quick-connect system of the present invention comprises two generally cylindrical major portions: A male portion 20 and a female portion 30 adapted to sealingly mate with one another.

Figure 3:
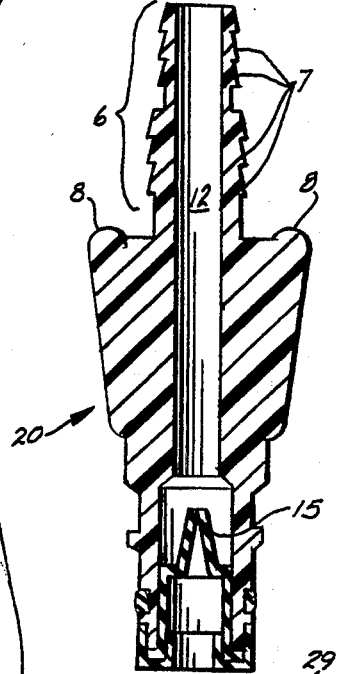
FIG. 3 is an elevational cross-sectional view of the quick-connect coupling of the present invention showing the male portion exploded away from the female portion taken along lines II—II of FIG. 4.
Figure 4:
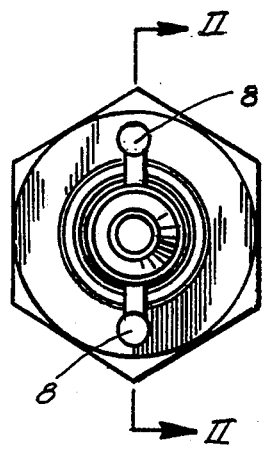
FIG. 4 is a top plan view of the quick-connect coupling of the present invention.
Figure 11:
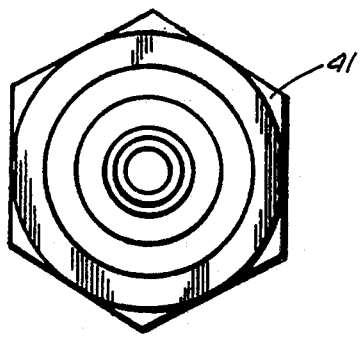
FIG. 11 is a top-plan view of the shipping plug of FIG. 8 which does not feature a one-way vent valve.
Figure 10:
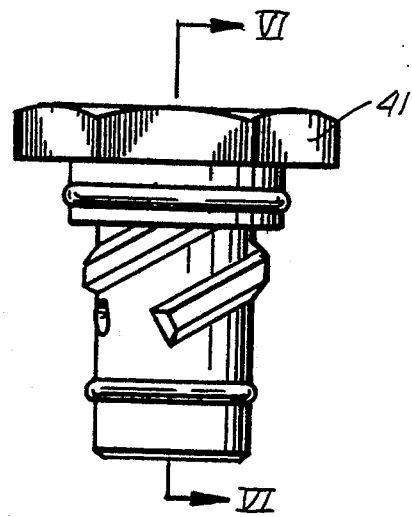
FIG. 10 is an elevational view of the shipping plug of the present invention.
Figure 8:
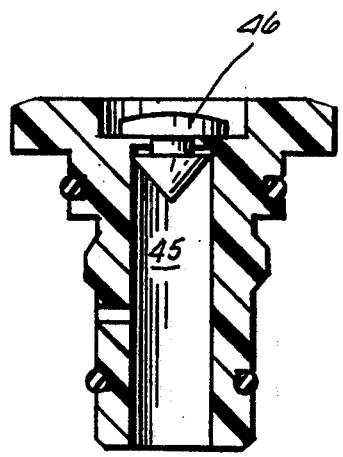
FIG. 8 is an elevational sectional view of one preferred embodiment of the shipping plug of the present invention showing a one-way venting valve taken along section lines VI—VI of FIG. 9.
Figure 9:
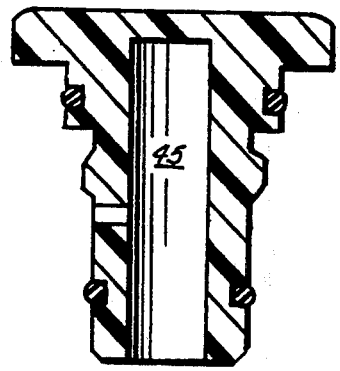
FIG. 9 is an elevational sectional view of one preferred embodiment of the shipping plug of the present invention without a one-way vent valve taken along section lines VI—VI of FIG. 9.

Now also with attention to FIGS. 3 and 5, the male portion further comprises a stepped barb comprising a plurality of barbs 6 which begin at one terminus of male portion 20 and increase in size at one point as their numbers extend toward a pair of finger grips 8. Grips 8, which function much like a wing nut, are provided with a cylindrical protrusion 9 along the length thereof to provide a non-slip finger gripping surface for twisting to secure or untwisting to unsecure male component 20 from female component 30. Male component 20 is further provided with an externally threaded shaft 10 whose external threads 11 are multiple start course pitch discontinuous threads which, when mated with correspondingly configured internal threads, provide a high ratio of axial movement to rotational movement whereby a 90° turn will fully thread or fully unthread male component 20 from female component 30. A cylindrical shaft 12 extending through male component 20 has disposed therein a flexible one-way valve 15 housed within externally threaded shaft 10 and having its ingress extending from the terminus of threaded shaft 10 through its egress toward the terminus of stepped barbed tip 6.

With particular attention to FIG. 5, female portion 30, being generally cylindrical in shape, comprises an externally threaded portion 31 provided with standard-sized pipe threads adapted to threadingly couple to any standard internally threaded pipe coupling. Female portion 30 is also provided with barbed tip 32 adapted to sealingly couple to a standpipe (not shown) and hexagonal head 29 adapted to be gripped by a standard open-ended wrench or the like for coupling female component 30 via external pipe threads 31 to an internally threaded pipe coupling. Female portion 30 is further provided with vent hole 34, disposed adjacent pipe threads 31 in air communication with a shaft 13 extending through and coaxially with female component 30. Female component 30 is provided with internal threads 35 which are multiple start course pitch discontinuous threads correspondingly configured to threads 11 of male component 20. Cylindrical female component 30 and internal threads 35 define a chamber 36 disposed in coaxial relationship with shaft 13 and having disposed within it between threads 31 and barbed tip 32 an annular sealing surface 37, more clearly shown in FIG. 3.

With particular attention to FIGS. 3 and 5, it is shown that externally threaded shaft 10 has disposed thereon, near its terminus, a radial seal 9 adapted to sealingly mate with annular sealing surface 37. Radial seal 9 will effect a fluid-tight seal against sealing surface 37 even in the event that externally threaded shaft 10 is only partially threaded onto internal threads 35 within chamber 36 of female component 30. This provision is an important benefit as potentially hazardous leakage will be prevented should the user neglect to fully thread male component 20 or if male component 20 is inadvertently twisted and partially unseated from within female component 30.

Now with particular attention to FIG. 6 which shows female component 30 partially in section revealing a shipping plug 40 threadingly seated therein, and with attention also to FIGS. 7–11 which illustrate various views of two preferred embodiments for shipping plug 40, it will be noted that shipping plug 40 comprises two major portions: Hexagonal head 41 adapted to be gripped by an open end wrench or the like; and a vented shaft 42 having a configuration substantially similar to externally threaded shaft 10 of male component 20.

Again referencing FIG. 6, note that while shipping plug 40 is seated within female component 30, vented shaft 42, chamber 36 and annular sealing surface 37 define an air space 39 between internal threads 35 and a vented shaft sealing component 44. Shipping plug 40 defines a concentric bore 45 shown in the sectional views of FIGS. 7 and 8 which, in one preferred embodiment illustrated in FIG. 7, is a through bore within which is disposed on one end a one-way umbrella valve 46, and in another preferred embodiment illustrated in FIG. 8, terminates adjacent hexagonal head 41. In either of the preferred embodiments, bore 45, when shipping plug 40 is mated with female component 30, is in air communication with barbed tip 32 of female component 30, vent 43 disposed on shipping plug shaft 42, vent 38 disposed on female component 30, air space 39 and, in one preferred embodiment, umbrella valve 46.

Figure 12:
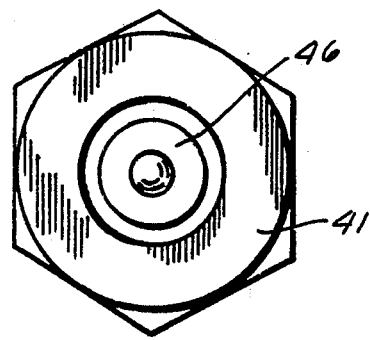
FIG. 12 is a top-plan view of the shipping plug of FIG. 7 which features a one-way vent valve.
Figure 14:
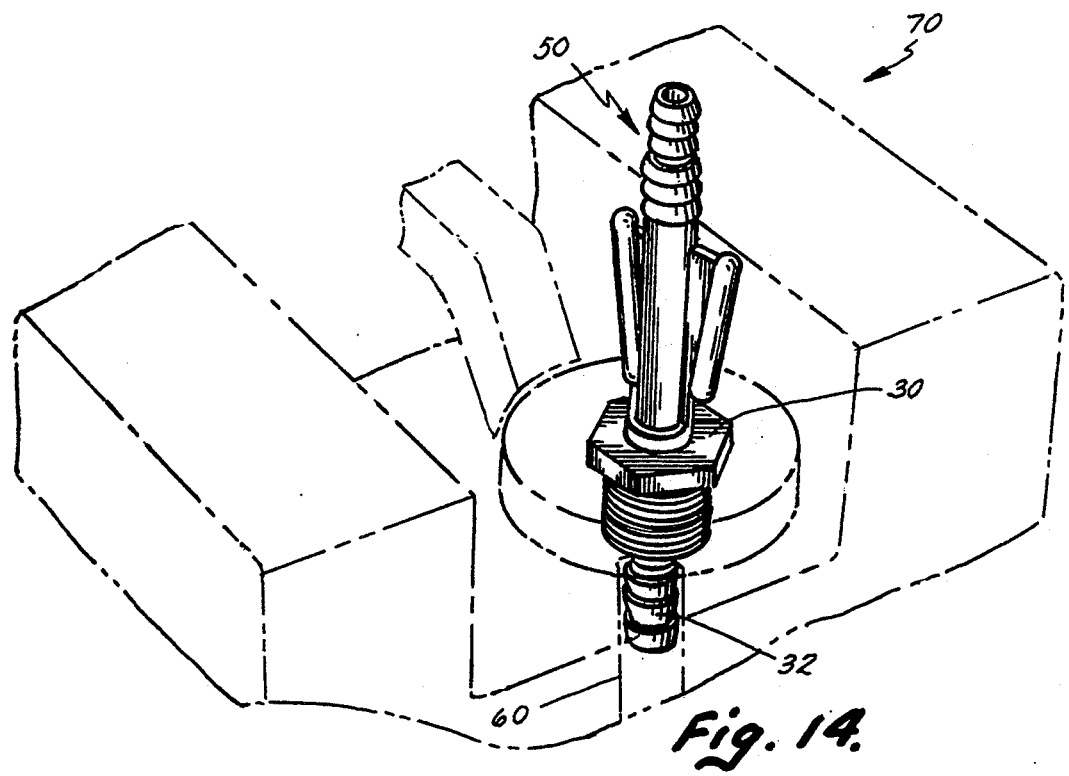
FIG. 14 is a perspective view showing the present invention coupled to a liquid container shown in phantom to illustrate the placement of the present invention in relationship to a liquid container.
Figure 13:
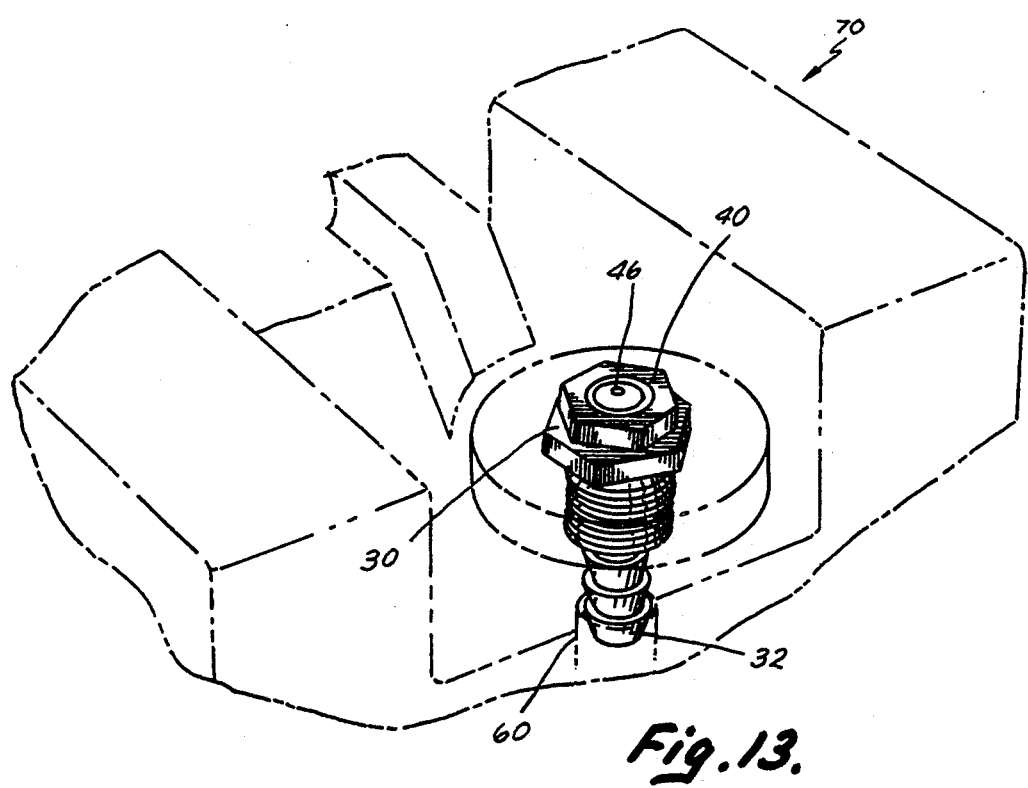
FIG. 13 is a perspective view showing the vented embodiment of the shipping plug of the present invention coupled to the female component which is, in turn, coupled to a container shown in phantom.

With particular reference to FIGS. 12 and 13, the utilization and the operation of the quick-connect system 50 will be discussed below. Referencing FIG. 13, a typical container 70 for storing liquid chemicals is shown in phantom. The container 70 is shown in phantom merely to illustrate the placement of quick-connect system 50 disposed within the opening of the container. As shown in FIG. 13, female portion 30 is disposed within the opening of container 70 and has a standpipe 60 shown in phantom disposed upon barbed tip 32 and extending down into container 70 and immersed in the liquid contained therein. Disposed within female component 30 is one preferred embodiment of shipping plug 40 which features umbrella valve 46.

Thus, FIG. 12 illustrates a typical configuration of a container with female component 30 and one embodiment of shipping plug 40 disposed in the opening thereof in shipping and/or storage mode whereby container 70 is allowed to vent any internal pressure to the outside atmosphere through umbrella valve 46 of shipping plug 40 and yet prevent any outside contaminants from entering the liquid contained therein. When appropriate, however, the unvented embodiment of shipping plug 40 will be used when venting the inside of container 70 is inappropriate or unnecessary. Shipping plug 40, it should be noted, is of a low profile and when installed is substantially flush with the surface of container 70 so that it will not become jarred loose or break during stacking and moving of containers during the shipping and handling thereof. It should be noted, however, that container 70 is merely an illustration of one type of container which may be used with the present invention. As noted previously, the present invention is adapted to be used with any container having standard-sized ¾″ plumbing fitments or alternately may be used by utilizing standpipe 60 alone.

Again referencing FIGS. 12 and 13, and particularly FIG. 12, before pumping liquid chemical from container 70 a user will first accomplish removal of shipping plug 40 from female portion 30 by gripping hexagonal head 41 either manually or with an open end wrench or the like and turning shipping plug 40 counterclockwise ¼ turn and simply unseating and withdrawing shipping plug 40 from female portion 30.

Once removal of shipping plug 40 is accomplished, male portion 20 can then be coupled to female portion 30 in the following manner: A user will first grasp the male component 20 by its midsection at grips 8. The user will then insert male component 20 within female component 30 by inserting externally threaded shaft 10 within chamber 36 wherein radial sealing component 9 will mate with sealing wall 37 and external threads 11 will mate with internal threads 35, thus effectively creating a fluid-tight seal between female component 30 and male component 20, even when not yet fully threaded. The user will then turn male component 20 within female component 30 ¼ turn clockwise, thus fully seating and fully threading male component 20 within chamber 36 of female component 30. As pointed out earlier, should the user fail to fully seat male component 20 within chamber 36 of female component 30, radial seal 10 will still effect a fluid tight seal against annular sealing wall 37 as long as radial sealing component 9 is in some contact with a portion of annular sealing wall 37.

Figure 2:
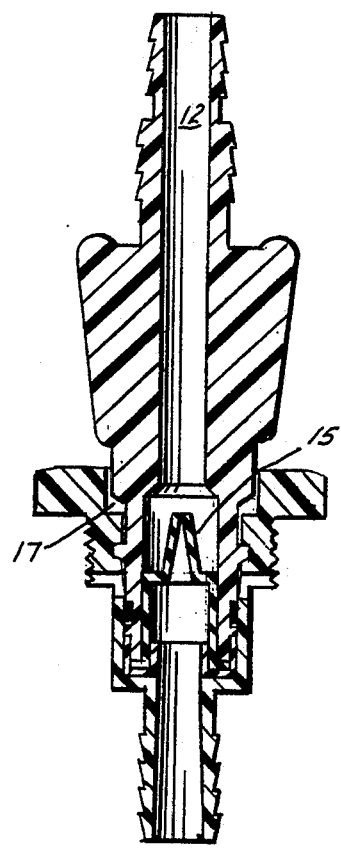
FIG. 2 is an elevational cross-sectional view of the quick-connect coupling of the present invention showing the male component coupled with the female component taken along lines II—II of FIG. 4.

Once male portion 20 is sealingly coupled with female portion 30, a vacuum feed line (not shown) is coupled to stepped barb tip 6 forming a fluid-tight seal therewith. The vacuum feed line will be connected to a vacuum pump (also not shown) for pumping the liquid from container 70 through the quick-connect system 50 and into a storage container (not shown). During pumping and as liquid is drawn from container 70 due to the pumping action, a partial vacuum is created within the container due to removal of the liquid thus hindering pumping, putting an excessive load on the pump and/or collapsing the container walls. With particular reference to FIG. 2, the problem of equalization of the air pressure between the inside of container 70 and the outside atmosphere is solved by provision of an annular air gap 17 which is in air communication with chamber 36 and vent 34. Thus, during pumping, air is allowed to enter through gap 17 into chamber 36, out of vent hole 34 and into container 70 to equalize the air pressure therein. Thus, the quick-connect system of the present invention is self-venting, thereby eliminating the need for a vented container.

When pumping is halted for whatever reason, a significant amount of liquid chemical will remain in the vacuum feed lines which, when no longer under the influence of the vacuum caused by the pump, will tend to flow in the direction of the container due to gravity. This phenomenon is commonly known as "backflow". With particular attention to FIG. 2, when backflow occurs the elastomeric one-way duckbill valve 15 will prevent the chemical fluid from entering quick-connect system 50 past cylindrical shaft 12 of male component 20 thereby preventing backflow of liquid chemical into container 70. More importantly, perhaps, is the stoppage of backflow within male component 20 at one-way duckbill valve 15 thus allowing the user to remove male component 20 from female component 30 without any significant contact of the liquid chemical with the user's skin.

This unique design facilitated by male component 20, female component 30, shipping plug 40 and the other embodiments thereof described herein creates an inexpensive, compact, quick-connect/disconnect fluid coupling system which is reusable and is utilized during shipping, storage and pumping of liquid chemical containers and minimizes or eliminates chemical contact with the user.

The above description is considered to be that of the preferred embodiments only. Modifications of the invention will occur to those who make and use the invention. The true scope and spirit of the invention is to be determined by reference to the appended claims. It is desired to include within the scope of the invention all such modifications that come within the scope of the appended claims.

The embodiments of the invention in which an exclusive property or privilege is claimed are defined as follows.

1. In a dispensing system for the dispensing of liquid chemicals that are unsuitable for contact with a user, the combination comprising:

a coupling device comprising a male component and a female component, both generally cylindrical in shape;

said male and female components having a common passage sharing a common axis extending coaxially therethrough;

said female component comprising a female tip disposed in a coaxial relationship with said passage and in fluid communication therewith;

said female tip being adapted to receive a standpipe means thereon in airtight fashion for fluid communication with a liquid to be dispensed;

said female component further comprising internal threads disposed on an annular wall which defines a chamber disposed within said female component in coaxial relationship with said passage;

said chamber comprising an annular sealing surface disposed adjacent to said internal threads;

said male component comprising an annular groove circumferentially disposed about a distal end thereof;

said annular groove having an annular elastomeric seal disposed therein;

said male component further comprising external threads which correspond with said internal threads of said female component whereby said male component is threadingly received within said chamber causing said elastomeric seal to sealingly engage said sealing surface in fluid-tight fashion;

said internal and said external threads being multiple start, coarse pitch discontinuous threads providing a high ratio of axial movement to rotational movement whereby a 90° rotation will fully thread and fully unthread said male component from said female component;

said male component further comprising a male tip disposed at a proximate end adapted to receive a liquid dispensing tube in a fluid-tight fashion;

said male component further comprising a one-way check valve disposed within said passage;

venting means disposed in said female component in air communication with said chamber for equalizing pressure within the container during dispensing of fluid;

said dispensing system further comprising an externally threaded shipping plug for sealingly engaging said female component during shipping of the container; and said shipping plug comprising a shaft having coarse pitch, discontinuous external threads disposed thereon adapted to threadingly couple with said internal threads of said female component in fluid-tight fashion thereby sealing the container from the outside atmosphere.

2. The coupling device of claim 1 wherein said shaft is hollow defining a concentric bore and comprises an elastomeric one-way vent disposed in said head in air communication with the outside atmosphere; said shaft further comprising vent means in air communication with said venting means for equalizing air pressure inside the container with that of the outside atmosphere.

3. The coupling device of claim 1 wherein said male tip and said female tip are barbed.

4. The coupling device of claim 1 wherein said male tip is stepped whereby said male tip is adapted to receive thereon feed lines of varying inside dimensions.

5. The coupling device of claim 1 wherein said female component is of a low profile whereby when said female component is disposed within the container said female component is substantially flush with the surface of the container.

6. The coupling device of claim 1 wherein said shipping plug comprises a hexagonal head adapted to be gripped by a wrench.

7. The coupling device of claim 1 wherein said male component comprises handle means for hand grasping whereby said male component can be hand grasped and turned in the manner of a wing nut.

8. The coupling device of claim 7 wherein said means for hand grasping comprise a pair of longitudinally extending flat finger grips.

9. The coupling device of claim 8 wherein said finger grips are provided with generally cylindrical protrusions along the longitudinal length thereof for providing a non-slip gripping surface thereon.

* * * * *